US011769117B2

(12) United States Patent
Ma et al.

(10) Patent No.: US 11,769,117 B2
(45) Date of Patent: Sep. 26, 2023

(54) BUILDING AUTOMATION SYSTEM WITH FAULT ANALYSIS AND COMPONENT PROCUREMENT

(71) Applicant: Johnson Controls Tyco IP Holdings LLP, Milwaukee, WI (US)

(72) Inventors: Ada L. Ma, Kenmore, WA (US); Sudhi R. Sinha, Milwaukee, WI (US); Erik S. Paulson, Madison, WI (US); Elyse R. Hobson, Milwaukee, WI (US); Youngchoon Park, Brookfield, WI (US); Justin J. Ploegert, Cudahy, WI (US); Sandeep K. Sen, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 16 days.

(21) Appl. No.: 16/746,570

(22) Filed: Jan. 17, 2020

(65) Prior Publication Data
US 2020/0233391 A1    Jul. 23, 2020

Related U.S. Application Data

(60) Provisional application No. 62/794,393, filed on Jan. 18, 2019, provisional application No. 62/794,533, (Continued)

(51) Int. Cl.
*G06Q 10/10* (2023.01)
*G06Q 10/1093* (2023.01)
(Continued)

(52) U.S. Cl.
CPC ......... *G06Q 10/1095* (2013.01); *G05B 15/02* (2013.01); *G05B 19/042* (2013.01);
(Continued)

(58) Field of Classification Search
CPC .............. G05B 19/042; G05B 23/0218; G05B 2219/25011; G06Q 10/1095;
(Continued)

(56) References Cited

U.S. PATENT DOCUMENTS 5,301,109 A    4/1994    Landauer et al.
5,446,677 A    8/1995    Jensen et al.
(Continued)

FOREIGN PATENT DOCUMENTS

AU    2019226217 A1    11/2020
AU    2019226264 A1    11/2020
(Continued)

OTHER PUBLICATIONS

HIPLA, "Visitor Management: Smart Solutions to visitors, saving time and maximizing productivity," URL: https://hipla.io/visitor-management.html, retrieved from internet Mar. 3, 2021, 3 pages.
(Continued)

*Primary Examiner* — Christopher E. Everett
*Assistant Examiner* — Christopher W Carter
(74) *Attorney, Agent, or Firm* — Foley & Lardner LLP

(57) ABSTRACT

One or more non-transitory computer-readable storage media having instructions stored thereon that, when executed by one or more processors, cause the one or more processors to receive data corresponding to a first condition of a building component within a building, determine, based on the data, an actual or anticipated fault state of the building component, retrieve, from a graph data structure including a number of entities and a number of relationships between the entities, and wherein the graph data structure represents at least one of a space, person, component, or event, first context information corresponding to the building component and second context information corresponding to the building, and determine, based on the first and second
(Continued)

context information, a service action for the building component.

20 Claims, 8 Drawing Sheets

Related U.S. Application Data filed on Jan. 18, 2019, provisional application No. 62/794,389, filed on Jan. 18, 2019, provisional application No. 62/794,502, filed on Jan. 18, 2019, provisional application No. 62/794,276, filed on Jan. 18, 2019, provisional application No. 62/794,348, filed on Jan. 18, 2019, provisional application No. 62/794,535, filed on Jan. 18, 2019, provisional application No. 62/794,357, filed on Jan. 18, 2019, provisional application No. 62/794,407, filed on Jan. 18, 2019, provisional application No. 62/794,489, filed on Jan. 18, 2019, provisional application No. 62/794,032, filed on Jan. 18, 2019, provisional application No. 62/794,415, filed on Jan. 18, 2019, provisional application No. 62/794,370, filed on Jan. 18, 2019.

(51) Int. Cl.

| | | |
|---|---|---|
| *G06Q 30/0601* | (2023.01) | |
| *G06F 9/451* | (2018.01) | |
| *G06F 16/28* | (2019.01) | |
| *G06F 16/248* | (2019.01) | |
| *G06F 16/25* | (2019.01) | |
| *H04L 9/32* | (2006.01) | |
| *G07C 9/37* | (2020.01) | |
| *G07C 9/00* | (2020.01) | |
| *G05B 19/042* | (2006.01) | |
| *G05B 23/02* | (2006.01) | |
| *G06Q 10/087* | (2023.01) | |
| *G06F 16/901* | (2019.01) | |
| *G06Q 10/0639* | (2023.01) | |
| *G08G 1/14* | (2006.01) | |
| *G07C 9/27* | (2020.01) | |
| *G07C 9/21* | (2020.01) | |
| *G07C 9/22* | (2020.01) | |
| *G07C 9/23* | (2020.01) | |
| *G07C 9/25* | (2020.01) | |
| *G07C 9/28* | (2020.01) | |
| *G06V 20/52* | (2022.01) | |
| *G06V 20/58* | (2022.01) | |
| *G06V 40/10* | (2022.01) | |
| *G07C 9/20* | (2020.01) | |
| *G05B 15/02* | (2006.01) | |
| *G06Q 50/26* | (2012.01) | |
| *G06V 20/62* | (2022.01) | |

(52) U.S. Cl.
CPC ......... *G05B 23/0218* (2013.01); *G06F 9/451* (2018.02); *G06F 16/248* (2019.01); *G06F 16/252* (2019.01); *G06F 16/288* (2019.01); *G06F 16/9024* (2019.01); *G06Q 10/06398* (2013.01); *G06Q 10/087* (2013.01); *G06Q 10/10* (2013.01); *G06Q 30/0633* (2013.01); *G06V 20/52* (2022.01); *G06V 20/586* (2022.01); *G06V 40/103* (2022.01); *G07C 9/00563* (2013.01); *G07C 9/21* (2020.01); *G07C 9/215* (2020.01); *G07C 9/22* (2020.01); *G07C 9/23* (2020.01); *G07C 9/253* (2020.01); *G07C 9/27* (2020.01); *G07C 9/28* (2020.01); *G07C 9/37* (2020.01); *G08G 1/142* (2013.01); *G08G 1/148* (2013.01); *G08G 1/149* (2013.01); *H04L 9/3247* (2013.01); *G05B 2219/25011* (2013.01); *G06Q 50/26* (2013.01); *G06V 20/625* (2022.01)

(58) Field of Classification Search
CPC .. G06Q 10/087; G06Q 10/10; G06Q 30/0633; G06F 16/252
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,180,663 B2 | 5/2012 | Tischhauser et al. |
| 8,229,470 B1 | 7/2012 | Ranjan et al. |
| 8,346,589 B1 | 1/2013 | Norton et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,629,755 B2 | 1/2014 | Hashim-Waris |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,907,803 B2 | 12/2014 | Martin |
| 8,941,465 B2 | 1/2015 | Pineau et al. |
| 8,990,127 B2 | 3/2015 | Taylor |
| 9,070,113 B2 | 6/2015 | Shafiee et al. |

(56) References Cited

U.S. PATENT DOCUMENTS

| | | |
|---|---|---|
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,202,322 B2 | 12/2015 | Kappeler et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,576,255 B2 | 2/2017 | Kalb et al. |
| 9,652,813 B2 | 5/2017 | Gifford et al. |
| 9,666,075 B2 | 5/2017 | Davies et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 9,955,318 B1 | 4/2018 | Scheper et al. |
| 10,055,114 B2 | 8/2018 | Shah et al. |
| 10,055,206 B2 | 8/2018 | Park et al. |
| 10,116,461 B2 | 10/2018 | Fairweather et al. |
| 10,154,138 B2 | 12/2018 | Te Booij et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,354,531 B1 | 7/2019 | Bronder et al. |
| 10,380,854 B1 | 8/2019 | Yu |
| 10,505,756 B2 | 12/2019 | Park et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,127,235 B2 | 9/2021 | Sinha et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0169514 A1* | 11/2002 | Eryurek ............ G06Q 30/0633 700/110 |
| 2002/0177909 A1 | 11/2002 | Fu et al. |
| 2002/0188557 A1 | 12/2002 | Ochiai |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0150908 A1 | 8/2003 | Pokorny et al. |
| 2003/0158704 A1 | 8/2003 | Triginai et al. |
| 2003/0158795 A1 | 8/2003 | Markham et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2004/0252288 A1* | 12/2004 | Kacyra ................. G01C 11/00 356/3.09 |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0015376 A1 | 1/2006 | Sattler et al. |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0227010 A1 | 10/2006 | Berstis et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0250417 A1 | 10/2007 | Lane et al. |
| 2007/0250920 A1 | 10/2007 | Lindsay |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0162198 A1* | 7/2008 | Jabbour ................. G06Q 10/10 705/5 |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0263467 A1 | 10/2008 | Wilkins |
| 2008/0266383 A1 | 10/2008 | Shah et al. |
| 2008/0281472 A1 | 11/2008 | Podgorny et al. |
| 2009/0070407 A1 | 3/2009 | Castle et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0128931 A1 | 5/2010 | Bongard |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0054968 A1 | 3/2011 | Galaviz |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0184943 A1 | 7/2011 | Norton et al. |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1* | 1/2012 | Mackay ................. G06Q 10/06 700/275 |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |

(56) References Cited

U.S. PATENT DOCUMENTS

| | | |
|---|---|---|
| 2012/0101637 A1 | 4/2012 | Imes et al. |
| 2012/0112929 A1 | 5/2012 | Gupta et al. |
| 2012/0135759 A1 | 5/2012 | Imes et al. |
| 2012/0136485 A1 | 5/2012 | Weber et al. |
| 2012/0143356 A1 | 6/2012 | Berg-Sonne et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0310852 A1 | 12/2012 | Ramalingamoorthy et al. |
| 2012/0323643 A1 | 12/2012 | Volz |
| 2012/0326893 A1 | 12/2012 | Glezerman |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0173062 A1 | 7/2013 | Koenig-Richardson |
| 2013/0204836 A1 | 8/2013 | Choi et al. |
| 2013/0226320 A1 | 8/2013 | Berg-Sonne et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0139359 A1 | 5/2014 | Paul et al. |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2014/0334684 A1 | 11/2014 | Strimling |
| 2014/0358285 A1 | 12/2014 | Aggarwal et al. |
| 2015/0019174 A1 | 1/2015 | Kiff et al. |
| 2015/0042240 A1 | 2/2015 | Aggarwal et al. |
| 2015/0066716 A1 | 3/2015 | Shortridge |
| 2015/0105917 A1 | 4/2015 | Sasaki et al. |
| 2015/0138001 A1 | 5/2015 | Davies et al. |
| 2015/0145468 A1 | 5/2015 | Ma et al. |
| 2015/0156030 A1 | 6/2015 | Fadell et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0220942 A1 | 8/2015 | Dubberley |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0310682 A1 | 10/2015 | Arora et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0049030 A1 | 2/2016 | G et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0134432 A1 | 5/2016 | Hund et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171785 A1 | 6/2016 | Banatwala et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0092130 A1 | 3/2017 | Bostick et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |

(56) References Cited

U.S. PATENT DOCUMENTS

| | | |
|---|---|---|
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0372271 A1 | 12/2017 | Goldsmith et al. |
| 2018/0005495 A1 | 1/2018 | Hieb |
| 2018/0012159 A1 | 1/2018 | Kozloski et al. |
| 2018/0013579 A1 | 1/2018 | Fairweather et al. |
| 2018/0018508 A1 | 1/2018 | Tusch |
| 2018/0024520 A1 | 1/2018 | Sinha et al. |
| 2018/0039238 A1 | 2/2018 | Gaertner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0211539 A1 | 7/2018 | Boss et al. |
| 2018/0239982 A1 | 8/2018 | Rutschman et al. |
| 2018/0268238 A1 | 9/2018 | Khan et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0308475 A1 | 10/2018 | Locke et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0065014 A1 | 2/2019 | Richter et al. |
| 2019/0088059 A1 | 3/2019 | Santhosh et al. |
| 2019/0088106 A1 | 3/2019 | Grundstrom |
| 2019/0089808 A1 | 3/2019 | Santhosh et al. |
| 2019/0094824 A1 | 3/2019 | Xie et al. |
| 2019/0096147 A1 | 3/2019 | Park et al. |
| 2019/0096217 A1 | 3/2019 | Pourmohammad et al. |
| 2019/0102840 A1 | 4/2019 | Perl et al. |
| 2019/0108492 A1 | 4/2019 | Nelson et al. |
| 2019/0121801 A1 | 4/2019 | Jethwa et al. |
| 2019/0122050 A1 | 4/2019 | Beals et al. |
| 2019/0130365 A1* | 5/2019 | Pell .................... G06Q 10/1095 |
| 2019/0138333 A1* | 5/2019 | Deutsch ............. G06Q 10/0639 |
| 2019/0138512 A1 | 5/2019 | Pourmohammad et al. |
| 2019/0147883 A1 | 5/2019 | Mellenthin et al. |
| 2019/0156601 A1 | 5/2019 | Sinha et al. |
| 2019/0158309 A1 | 5/2019 | Park et al. |
| 2019/0163152 A1 | 5/2019 | Worrall et al. |
| 2019/0172165 A1 | 6/2019 | Verteletskyi et al. |
| 2019/0268178 A1 | 8/2019 | Fairweather et al. |
| 2019/0310979 A1 | 10/2019 | Masuzaki et al. |
| 2019/0342112 A1 | 11/2019 | Li et al. |
| 2019/0361852 A1 | 11/2019 | Rogynskyy et al. |
| 2019/0377306 A1 | 12/2019 | Harvey |
| 2020/0035101 A1 | 1/2020 | Brooks et al. |
| 2020/0116505 A1 | 4/2020 | Lei et al. |
| 2020/0210906 A1 | 7/2020 | Rice et al. |
| 2020/0226156 A1 | 7/2020 | Borra et al. |
| 2020/0234523 A1* | 7/2020 | Ma ....................... G06V 40/103 |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |

FOREIGN PATENT DOCUMENTS

| | | |
|---|---|---|
| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 103942308 A | 7/2014 |
| CN | 104040583 A | 9/2014 |
| CN | 104603832 A | 5/2015 |
| CN | 104919484 A | 9/2015 |
| CN | 105841293 | 8/2016 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2008-310533 A | 12/2008 |
| JP | 2010-277532 A | 12/2010 |
| JP | 2013-152618 A | 8/2013 |
| JP | 2014-044457 A | 3/2014 |
| JP | 2015-060434 A | 3/2015 |
| KR | 2016066115 | 6/2016 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2018/232147 A1 | 12/2018 |
| WO | WO-2020/061621 A1 | 4/2020 |
| WO | WO-2022/042925 A1 | 3/2022 |

(56) References Cited

FOREIGN PATENT DOCUMENTS

OTHER PUBLICATIONS

Siemens, "The office as an active contributor to business success," URL: https://new.siemens.com/bg/en/products/buildings/markets/smart-office.html, retrieved from internet Mar. 4, 2021, 12 pages.
SPLAN, "Visitor Management: Manage visitor registrations and check-ins in an efficient and secured manner." URL: https://www.splan.com/visitor-management-system.html, 11 pages.
International Search Report and Written Opinion on PCT/US2017/013647, dated Apr. 18, 2017, 10 pages.
Bernard, "What is Digital Twin Technology—And Why is it so Important?", Enterprise Tech, Mar. 6, 2017 (5 pages).
U.S. Appl. No. 17/566,029, Passivelogic, Inc.
U.S. Appl. No. 17/567,275, Passivelogic, Inc.
U.S. Appl. No. 17/722,115, Passivelogic, Inc.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema for Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Oct. 22, 2021 (1795 pages total).
Digital Platform Litigation Documents Part 2, includes IPR2023-00085 (documents filed Oct. 20, 22) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2022-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.

(56) References Cited

OTHER PUBLICATIONS

International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work for Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

\* cited by examiner

BUILDING AUTOMATION SYSTEM WITH FAULT ANALYSIS AND COMPONENT PROCUREMENT

CROSS-REFERENCE RELATED TO RELATED APPLICATION

The present application claims the benefit and priority to U.S. Provisional Patent Application No. 62/794,370, filed on Jan. 18, 2019, U.S. Provisional Patent Application No. 62/794,276, filed on Jan. 18, 2019, U.S. Provisional Patent Application No. 62/794,533, filed on Jan. 18, 2019, U.S. Provisional Patent Application No. 62/794,535, filed on Jan. 18, 2019, U.S. Provisional Patent Application No. 62/794,389, filed on Jan. 18, 2019, U.S. Provisional Patent Application No. 62/794,393, filed on Jan. 18, 2019, U.S. Provisional Patent Application No. 62/794,415, filed on Jan. 18, 2019, U.S. Provisional Patent Application No. 62/794,032, filed on Jan. 18, 2019, U.S. Provisional Patent Application No. 62/794,357, filed on Jan. 18, 2019, U.S. Provisional Patent Application No. 62/794,348, filed on Jan. 18, 2019, U.S. Provisional Patent Application No. 62/794,407, filed on Jan. 18, 2019, U.S. Provisional Patent Application No. 62/794,502, filed on Jan. 18, 2019, and U.S. Provisional Patent Application No. 62/794,489, filed on Jan. 18, 2019 the entire disclosures of each of which are incorporated by reference herein.

BACKGROUND

The present disclosure relates generally to a building management system and more particularly to fault detection systems in buildings. The present disclosure relates specifically to a fault detection system which intelligently procures components based on inventory and detected faults.

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. At times, various components in such systems may experience faults. Some faults may result in replacement of components which caused the fault.

SUMMARY

One implementation of the present disclosure is one or more non-transitory computer-readable storage media having instructions stored thereon that, when executed by one or more processors, cause the one or more processors to receive data corresponding to a first condition of a building component within a building, determine, based on the data, an actual or anticipated fault state of the building component, retrieve, from a graph data structure including a number of entities and a number of relationships between the entities, and wherein the graph data structure represents at least one of a space, person, component, or event, first context information corresponding to the building component and second context information corresponding to the building, and determine, based on the first and second context information, a service action for the building component.

In some embodiments, determining the service action for the building component includes determining an availability of a replacement component by cross-referencing an inventory database including data corresponding to an inventory of available replacement components with an identifier, and in response to determining that the replacement component is not available, procuring the replacement component by generating an order with a supplier of the replacement component. In some embodiments, determining the availability of the replacement component further includes identifying, based on the second context information, a similar component within the building as the replacement component, wherein the similar component is unused. In some embodiments, the first context information includes information describing an impact of the building component, and wherein determining the service action for the building component further includes generating a service priority corresponding to the building component based on the impact. In some embodiments, determining the service action includes generating a ticket for replacing the building component, and transmitting the ticket to a client device associated with a member of a facility team. In some embodiments, the ticket is generated in response to receiving the replacement component from the supplier. In some embodiments, the graph data structure includes the inventory database. In some embodiments, the inventory database is separate of the graph data structure. In some embodiments, the first context information includes impact information related to the actual or anticipated fault state, and wherein determining the service action includes determining whether to replace the building component based on the impact information.

Another implementation of the present disclosure is a method including receiving data corresponding to a first condition of a building component within a building, determining, based on the data, an actual or anticipated fault state of the building component, retrieving, from a graph data structure including a number of entities and a number of relationships between the entities, and wherein the graph data structure represents at least one of a space, person, component, or event, first context information corresponding to the building component and second context information corresponding to the building, and determining, based on the first and second context information, a service action for the building component.

In some embodiments, determining the service action for the building component includes determining an availability of a replacement component by cross-referencing an inventory database including data corresponding to an inventory of available replacement components with an identifier, and in response to determining that the replacement component is not available, procuring the replacement component by generating an order with a supplier of the replacement component. In some embodiments, determining the availability of the replacement component further includes identifying, based on the second context information, a similar component within the building as the replacement component, wherein the similar component is unused. In some embodiments, the first context information includes information describing an impact of the building component, and wherein determining the service action for the building component further includes generating a service priority corresponding to the building component based on the impact. In some embodiments, determining the service action includes generating a ticket for replacing the building component, and transmitting the ticket to a client device associated with a member of a facility team. In some embodiments, the ticket is generated in response to receiving the replacement component from the supplier. In some embodiments, the graph data structure includes the inventory database. In some embodiments, the inventory database is separate of the graph data structure. In some embodiments, the first context information includes impact information related to the actual or anticipated fault state, and wherein determining the service action includes determining whether to replace the building component based on the impact information.

Another implementation of the present disclosure is a building management system (BMS) including one or more processing circuits and one or more computer readable storage media, the one or more computer readable storage media having instructions stored thereon that, when executed by the one or more processing circuits, cause the one or more processing circuits to receive data corresponding to a first condition of a building component within a building, determine, based on the data, an actual or anticipated fault state of the building component, retrieve, from a graph data structure including a number of entities and a number of relationships between the entities, and wherein the graph data structure represents at least one of a space, person, component, or event, first context information corresponding to the building component and second context information corresponding to the building, and determine, based on the first and second context information, a service action for the building component.

In some embodiments, determining the service action for the building component includes determining an availability of a replacement component by cross-referencing an inventory database including data corresponding to an inventory of available replacement components with an identifier, and in response to determining that the replacement component is not available, procuring the replacement component by generating an order with a supplier of the replacement component.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the FIGURES, systems and methods for building automation with fault analysis and intelligent component procurement is described. Generally speaking, a fault detection processing circuit is configured to receive data corresponding to a condition of a building subsystem within a building. The fault detection processing circuit determines that the condition is indicative of a component of the building subsystem experiencing a fault. The fault detection processing circuit determines an availability of a replacement component. When a replacement component is not available, the fault detection processing circuit may initiate procurement of the replacement component by automatically generating an order with a supplier of the replacement component.

According to the aspects described herein, where components experience (whether current or are anticipated to experience) faults, those components may be procured in an efficient and expedient manner. Such embodiments may limit potential long-term shutdowns of buildings by automatically initiating procurement of replacement components on an as-needed basis. Furthermore, where a component is anticipated to experience a fault at a subsequent point in time, the replacement component can be proactively procured and the component can be replaced at a more opportune time, thus limiting the potential downtime from a fault. Various other benefits are described in further detail below.

Figure 1A:
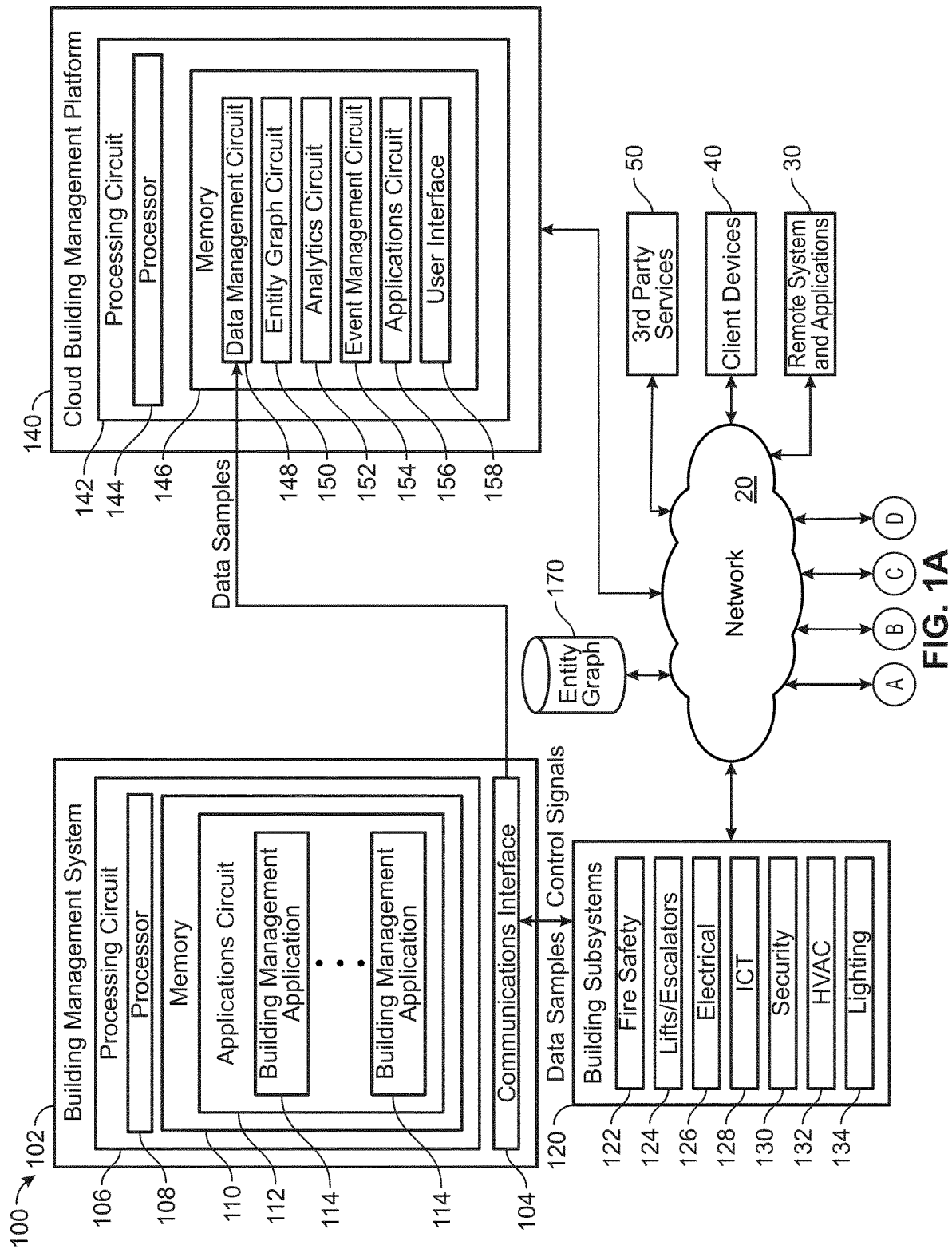
FIG. 1A is a block diagram of a smart building environment, according to an exemplary embodiment.
Figure 1B:
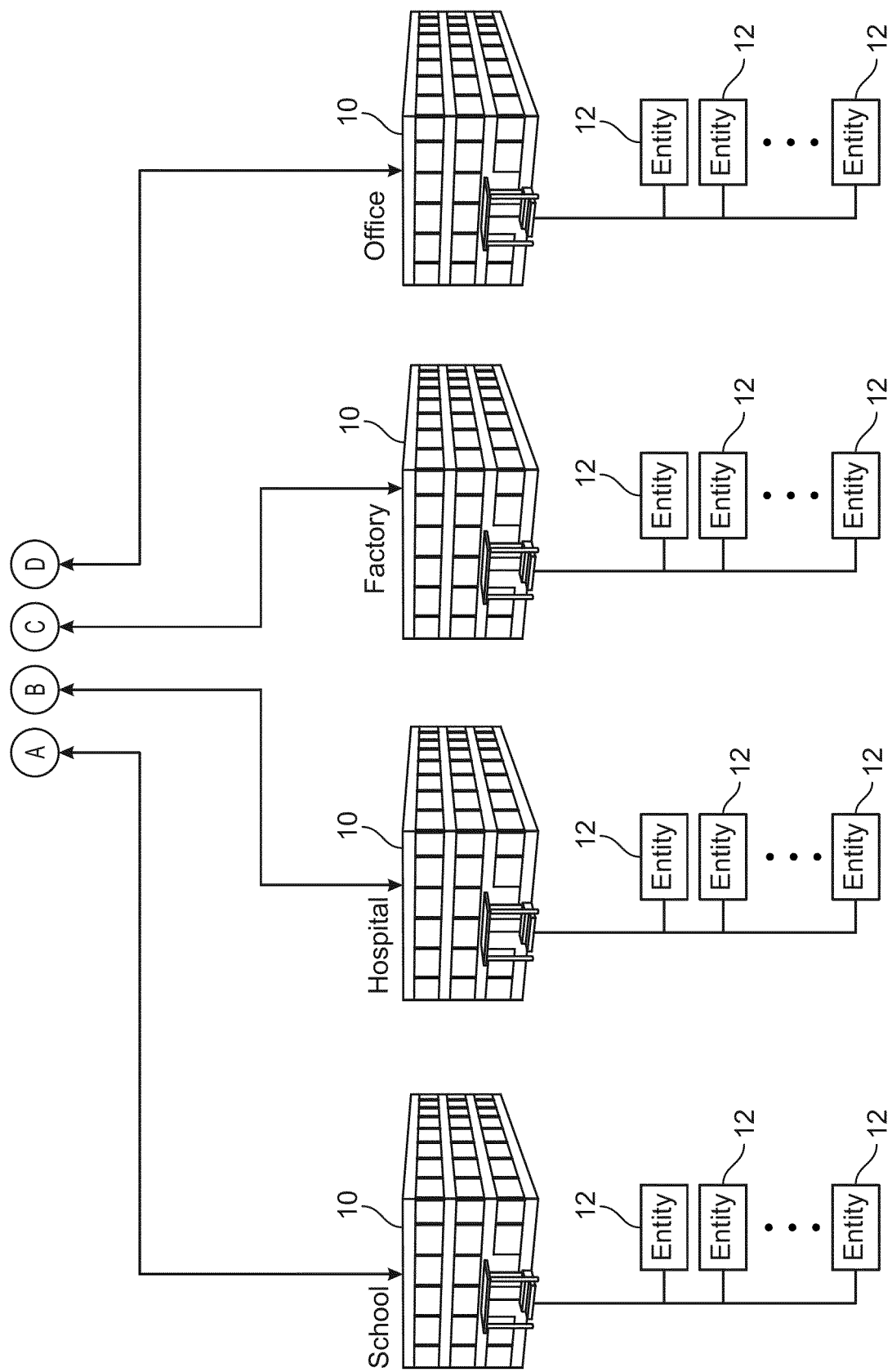
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. Cloud building management platform 140 may be configured to collect information from a variety of different data sources. Cloud management platform 140 may create digital representations, referred to as "digital twins," of physical spaces, equipment, people, and/or events based on the collected information. In various embodiments, the digital representations are stored in an entity graph. In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between the variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiment each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a user. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc). For example, user interface 158 may facilitate chatbot interaction, voice commands, user authentication, biometric feedback, or the like.

Figure 2:
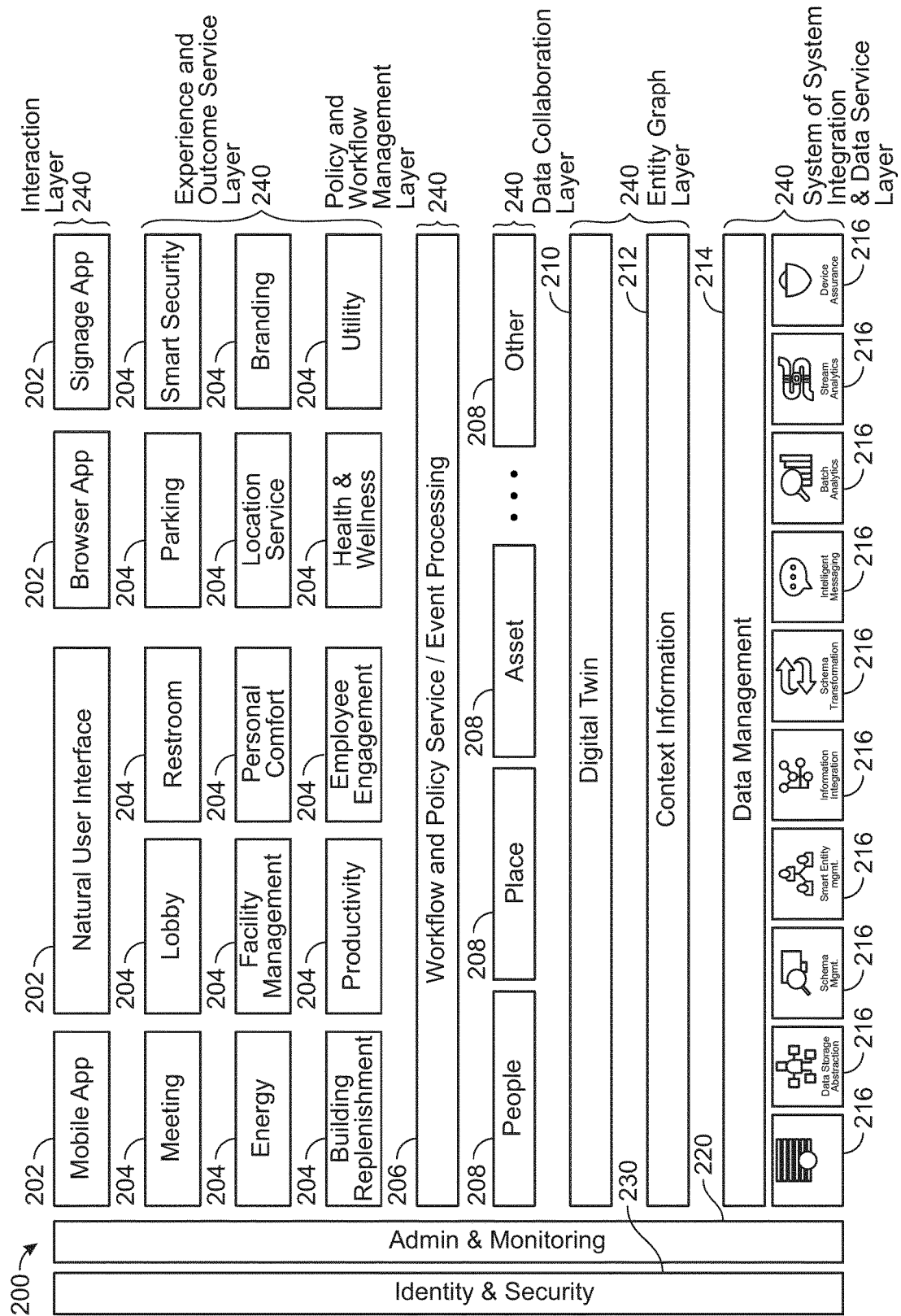
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring a cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.).

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active compute process. For example, a digital twin 210 may communicate with other digital twins 210, and to sense, predict and acts. In various embodiments, digital twin 210 is generated dynamically. For example, a digital twin 210 corresponding to a conference room may update its status by looking at occupancy sensors or an electronic calendar (e.g., to turn its status "available" if there is no show, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
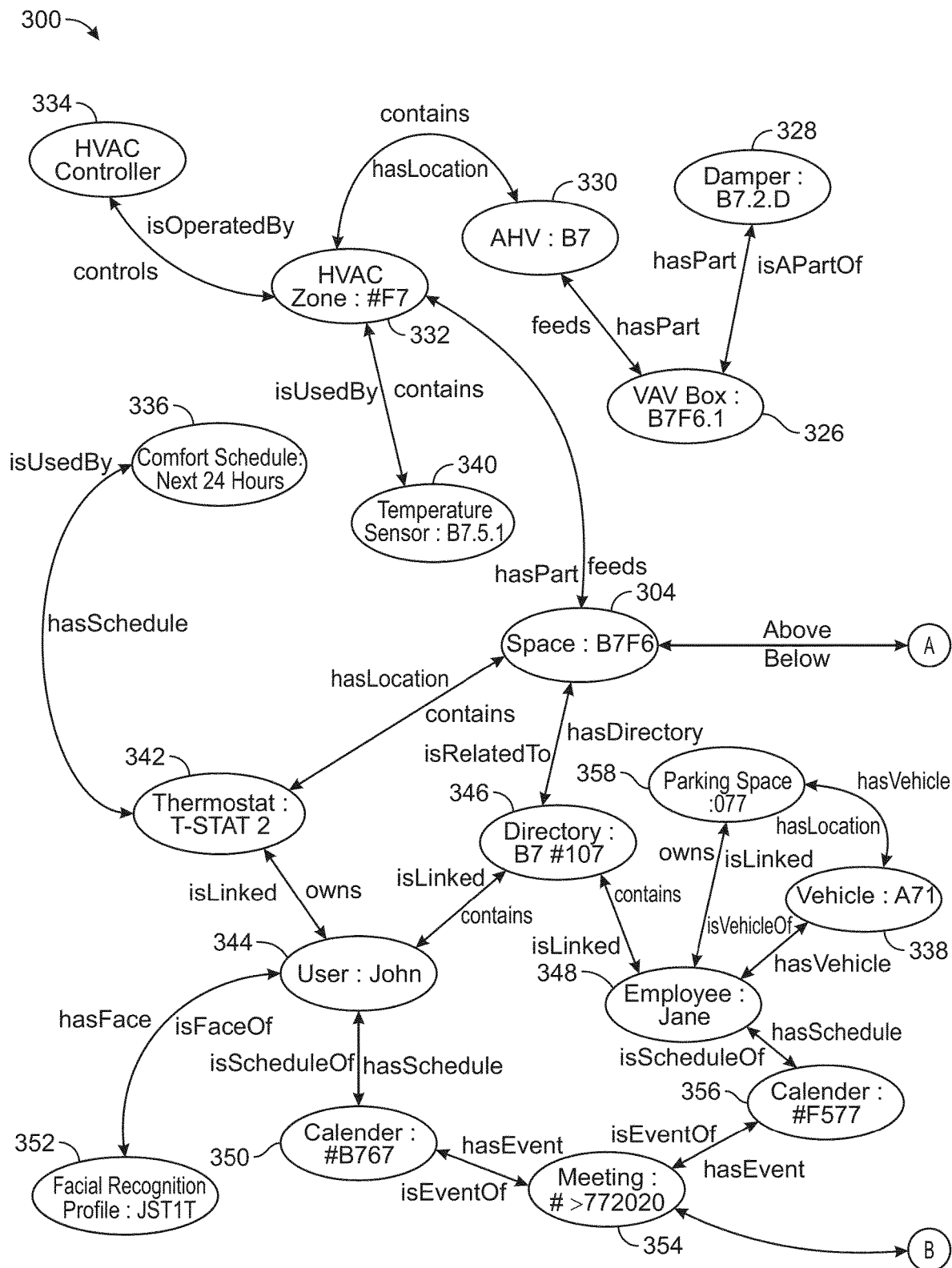
FIG. 3A is a block diagram of an entity graph, according to an exemplary embodiment.
Figure 3B:
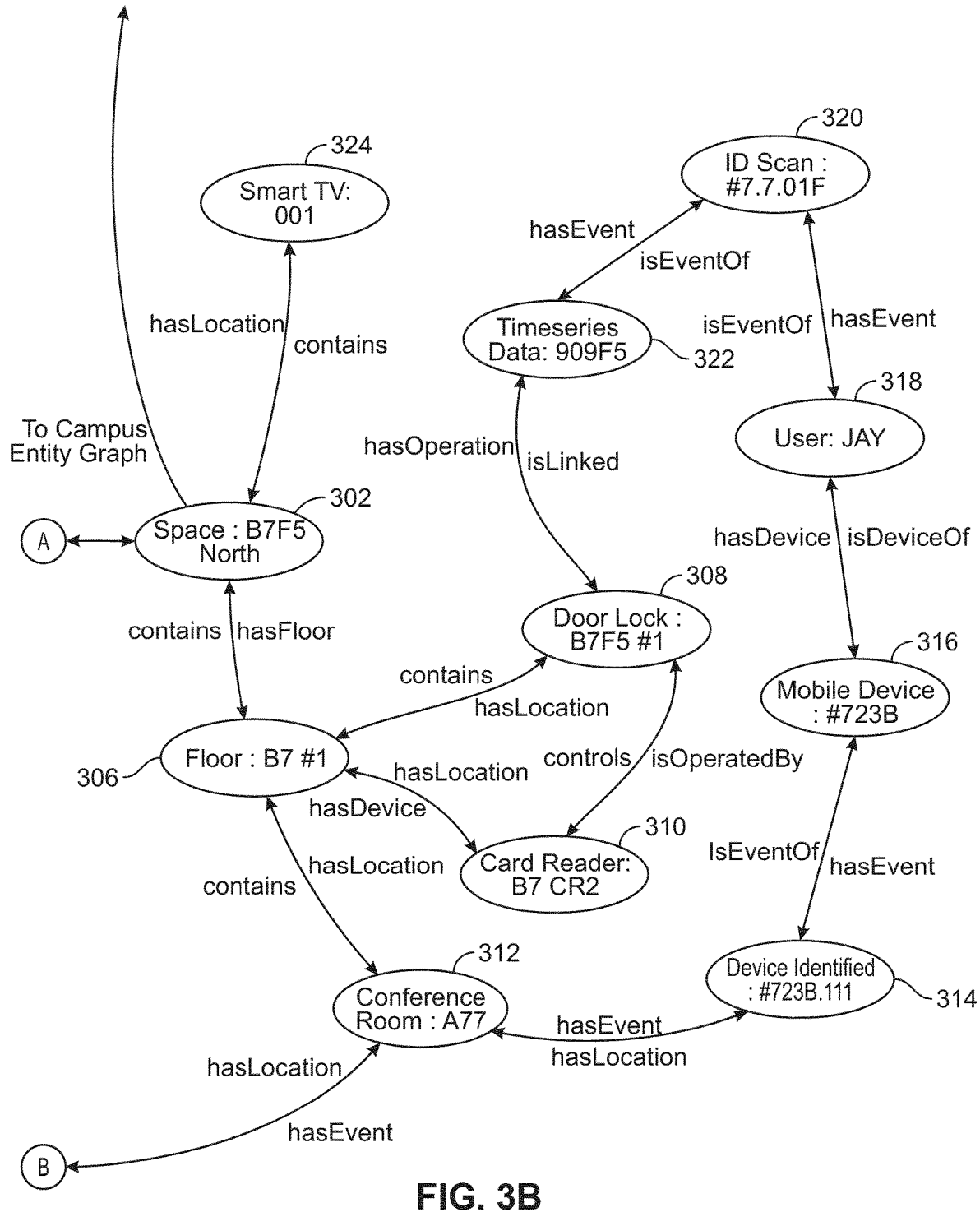
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships. While the nodes represent the building and its components, the edges describe how the building operates. The nodes and edges together create a digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayer system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in my office) these applications may never reach their full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems and also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data that is received and ingested into entity graph 300. For example, cloud building management platform 140 is configured to identify a door lock and card reader and generate a number of nodes and edges in entity graph 300 representing the card reader controller operation of the door lock.

Fault Detection and Management System

Figure 4:
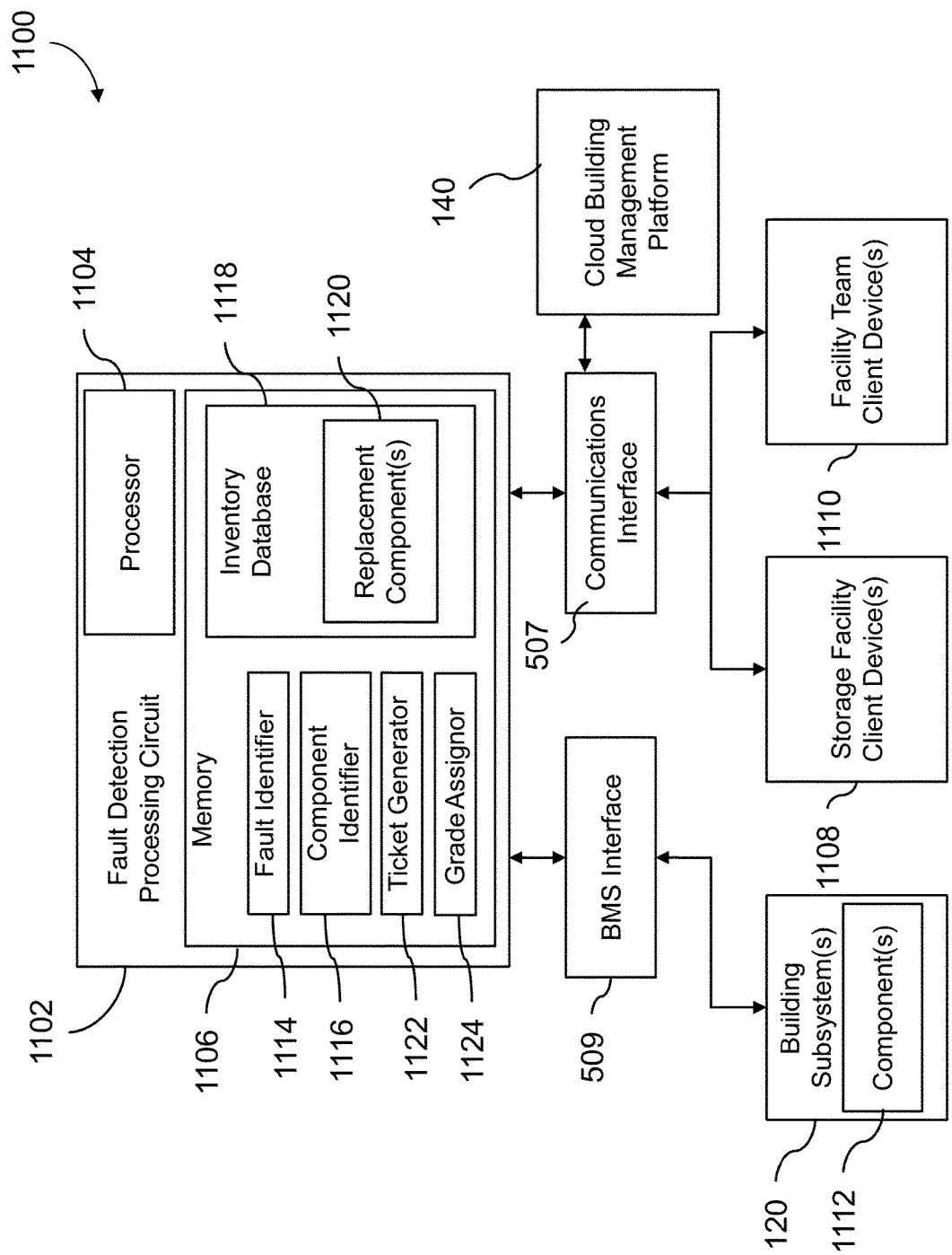
FIG. 4 is a block diagram of a fault detection and management system, according to an exemplary embodiment.

Referring now to FIG. 4, depicted is a fault detection and management system 1100, according to an exemplary embodiment. The present application is related to Provisional Application No. 62/794,370, titled "Smart Building Automation System With Digital Twin Configuration and Analytics," filed on Jan. 18, 2019, the entire disclosure of which is incorporated herein by reference. In some embodiments, one or more features of the present application may be implemented according to one or more features of the smart building automation system described therein. The fault detection management system 1100 is shown to include a fault detection processing circuit 1102. In some embodiments, the fault detection processing circuit 1102 is incorporated into BMS 102 described above with reference to FIG. 1A.

The fault detection processing circuit 1102 includes a processor 1104 and memory 1106. The processor 1104 may be similar in some aspects to processor 108 described above with reference to FIG. 1A. Similarly, the memory 1106 may be similar in some aspects to memory 110 described above with reference to FIG. 1A. The memory 1106 may be structured to store various circuits, modules, database(s), etc.

The fault detection management system 1100 is shown to include BMS interface 509 and communications interface 507. The BMS interface 509 may communicably couple the fault detection processing circuit 1102 and building subsystems 120 (e.g., described above with reference to FIG. 1A) to provide for communication and/or exchange of data between the fault detection processing circuit 1102 and building subsystems 120. The communications interface 507 may communicably couple the fault detection processing circuit 1102 with various client devices, such as storage facility client device(s) 1108, facility team client device(s) 1110, and/or cloud building management platform 140 as described in greater detail below. For example, fault detection processing circuit 1102 may retrieve context information by traversing entity graph 170 in communication with cloud building management platform 140. In some embodiments, storage facility client device(s) 1108 and/or facility team client device(s) 1110 may not be part of fault detection and management system 1100, but may be user devices such as smartphones from which fault detection and management system 1100 receives input data. In various embodiments, fault detection processing circuit 1102 communicates with external systems (e.g., storage facility client device(s) 1108, facility team client device(s) 1110, etc.), using near-field-communication (NFC), Bluetooth, WiFi, cellular connections (e.g., via a 4G or 5G access point/small cell base station, etc.).

The building subsystems 120 are shown to include various components 1112. Components 1112 may include fire safety subsystem 122, lift/escalator subsystem 124, electrical subsystem 126, ICT subsystem 128, security subsystem 130, HVAC subsystem 132, lighting subsystem 134, and so forth. The components 1112 may be or include any devices or components which are configured to provide functionality or facilitate functionality to building subsystems 120. Various examples of components include, for instance, an active chilled beam, an air handling unit, boiler, boiler water pump(s), chilled water pump(s), chilled water system, cooling tower, condenser water pump(s), constant air volume, exhaust fans, fan coil unit, hot water pump(s), package unit, reheat coil(s), roof top unit, supply fan(s), unit heater, unit ventilator, variable air volume, various actuators for controlling such valves, pumps, etc. and so forth.

The fault detection processing circuit 1102 may be configured to receive data or other inputs from the building subsystems 120 (e.g., via the BMS interface 509 or similar interface configured to provide for communication between the building subsystems 120 and the fault detection processing circuit 1102). In some embodiments, the data may be received from components 1112 of building subsystems 120. In some embodiments, the data may be received from sensors or other monitoring systems arranged within the building subsystems 120 and configured to monitor a condition of the building subsystems 120. Hence, the data may be or include data corresponding to a condition of the respective building subsystem. In some examples, the condition may indicate a current operating condition of the building subsystem, an output or throughput of the building subsystem, various settings of the building subsystem, and/or an operating condition/output/throughput/settings/etc. for components 1112 of the building subsystems 120. The fault detection processing circuit 1102 may be configured to identify faults of the components based on the received data, as described in greater detail below.

The fault detection processing circuit 1102 is shown to include a fault identifier 1114. The fault identifier 1114 may be configured to automatically diagnose and respond to detected faults based on data received by the fault detection processing circuit 1102 from the building subsystems 120. As used hereinafter, reference made to "faults" which are detected by the fault detection processing circuits includes both current faults (e.g., components currently experiencing a fault) and anticipated (or predicted, forecasted, etc.) faults (e.g., faults which are likely or anticipated to occur based on data corresponding to the condition of the building subsystem). The faults may be used for ordering or otherwise initiating procurement of components and inventory. Hence, where the fault identifier 1114 predicts a fault is anticipated to occur, the systems and methods described herein may proactively order components to meet demands likely to occur.

The fault identifier 1114 may be configured to analyze data (which may be or include time series data) received from the building subsystems 120 to automatically diagnose and respond to detected faults. The fault identifier 1114 may be configured to analyze the data by comparing the real-time (or near real-time) data to expected values (e.g., within a number of standard deviations or other thresholds, for instance) to determine whether the building subsystems 120 are functioning properly. Where the fault identifier 1114 identifies real-time data outside of the expected values, the fault identifier 1114 may be configured to assign a fault to the building subsystems 120.

The memory 1106 is shown to include a component identifier 1116. The component identifier 1116 may be configured to identify the component(s) 1112 causing the condition which indicates the fault. In some embodiments, the data corresponding to the condition may include metadata generated by each of the component(s) 1112. In such embodiments, the data received by the fault detection processing circuit 1102 may be received from the component(s) 1112. The metadata may include data which identifies the component which generated the metadata (e.g., a component identifier, a barcode, a part ID, etc.). The component identifier 1116 may be configured to identify the component(s) 1112 causing the condition which indicates the fault based on the metadata generated by the component 1112. In some embodiments, the component identifier 1116 may be configured to identify the component(s) 1112 causing the condition which indicates the fault based on a location of the sensor(s) which generated the data. The component identifier 1116 may be configured to maintain a database or registry of the location of each sensors and components in the building subsystems 120. The component identifier 1116 may be configured to identify the component(s) 1112 causing the condition which indicates the fault based on the location of the component(s) 1112 with respect to the various sensor(s) in the building subsystems 120. The component identifier 1116 may be configured to compare sensor data for each of the sensors to identify the location of the component(s) 1112 causing the condition which indicates the fault. As one non-limiting example, where the component is a valve in the HVAC subsystem 132 which is normally closed and operating properly, a pressure sensor upstream from the ball valve may show a first pressure and a pressure sensor downstream from the valve may show a second pressure downstream from the valve. Where the pressure sensor upstream from the valve and downstream from the valve register pressures that are approaching one another, the component identifier 1116 may be configured to determine that the valve is currently experiencing (or is anticipated to experience) a fault.

In some embodiments, the component identifier 1116 may integrate with or otherwise utilize a digital twin of a building, space, component, or the like. For example, the component identifier 1116 may traverse an entity graph 170 representing a digital twin of a component to retrieve information associated with the component. For example, the component identifier 1116 may retrieve context information describing a usage frequency of a component (e.g., how often the component is used, etc.). The context information may include a service history of the component, a sub-component list, an operational status of the component (e.g., is the part currently in working order, etc.), a usage frequency of the component, a physical location of the component, a make/model of the component, physical characteristics of the component (e.g., images, description, etc.), a price of the component, a replacement inventory of the component, a replacement provider for the component, a price of the component, a list of similar components in building 10, and/or any other information describing the component. Additionally or alternatively, the component identifier 1116 may retrieve context information corresponding to building 10. For example, the component identifier 1116 may retrieve a list of components of a first type in building 10 and usage histories associated with each of the components on the list. In some embodiments, the component identifier 1116 may receive an indication that a first component is in a non-functional fault state and may retrieve context information (e.g., by traversing an entity graph 170 representing a digital twin of building 10, etc.) to identify similar components as the first component that are unused (e.g., not used frequently, in storage, etc.) that can be used to replace the first component.

In some embodiments, the component identifier 1116 may be configured to assign a priority to the identified fault. The component identifier 1116 may be configured to assign a priority of critical, high, medium, or low to each identified fault. The component identifier 1116 may be configured to assign the priority based on, for instance, the component 1112 causing the condition which indicates the fault (e.g., some components 1112 may be more critical to functionality of the building subsystems 120 than other components 1112), the data received by the fault detection processing circuit 1102 corresponding to the condition indicating the fault, the rate of change of the data, and so forth. The component identifier 1116 may assign weights to different components 1112, perform various mathematical operations, etc. to compute a value corresponding to the priority of the fault. The component identifier 1116 may compare the computed value to thresholds corresponding to each of the available priorities (e.g., critical, high, medium, or low). The component identifier 1116 may be configured to assign the priority based on the comparison of the computed value to the thresholds. In various embodiments, the component identifier 1116 assigns a fault priority based on context information associated with the component. For example, the component identifier 1116 may retrieve context information corresponding to a faulty component (e.g., by traversing an entity graph 170 representing a digital twin of the faulty component, etc.), determine, based on the context information, that the faulty component is rarely used (e.g., a projector in a conference room that is only turned on once every other month, etc.), and in response, assign a low fault priority to the faulty component. As an additional example, the component identifier 1116 may retrieve context information corresponding to a faulty component, determine that the fault component is very expensive to replace (e.g., based on replacement price information included in the context information, etc.), determine that there is low demand for use of the fault component (e.g., a backup generator for a building that has been converted into non-essential storage, etc.), and assign a low fault priority to the faulty component.

In some instances, the fault may result in replacement of the corresponding component 1112. As such, to remedy the fault, an operator or facility team member may replace the component 1112 with a replacement component that may be located in a storage facility or other storage space within the building, or received from a supplier. Additionally or alternatively, fault detection processing circuit 1102 may identify a replacement component from within building 10. For example, fault detection processing circuit 1102 may identify a component similar to the faulty component within building 10 that is unused (e.g., a projector in a conference room that is only turned on once a month, etc.) as the replacement component. In various embodiments, fault detection processing circuit 1102 may retrieve context information including component usage histories to identify replacement components from within building 10. As described in greater detail below, the fault detection processing circuit 1102 may be configured to automatically identify replacement components 1112 if available and, if not, automatically initiating procurement of the replacement components 1112.

The memory 1106 may be structured to store or otherwise include an inventory database 1118. While shown as embodied on the memory 1106 of the fault detection processing circuit 1102, in some implementations, the inventory database 1118 may be located remotely from the fault detection processing circuit 1102 such as on the storage facility client devices 1108, on a remote server, etc. The inventory database 1118 may be a database which includes data corresponding to a current inventory of replacement components 1120 available for use. In some embodiments, the inventory database 1118 may be implemented as, configured as, or otherwise correspond to an entity graph. The entity graph may model, mirror, or otherwise represent the building 10. The entity graph may include entities which represent equipment, spaces, zones, rooms, and so forth within the building. The entities represented in the entity graph may be connected, displayed, or otherwise represented to show relationships amongst the entities. In this regard, the inventory database 1118 may be a "digital twin" of the building. As described in greater detail below, a determination of availability of inventory may be performed by querying the inventory database 1118 (e.g., the relevant portion or entity within the inventory database 1118). The querying of the inventory database 1118 may be automated (e.g., with no human or manual intervention). In this regard, the determination of available inventory may be performed without manual intervention.

The replacement components may be stored at a storage facility as described above. In some embodiments, as replacement components and other inventory is received, an operator or facility team member may update the inventory database 1118 via the storage facility client device 1108. For instance, the operator/facility team member may provide inputs to the storage facility client device 1108 including a component or part number (or other identifier associated with the replacement components 1120) and quantity as new replacement components 1120 are received at the storage facility. The storage facility client device 1108 may update the inventory database 1118 to reflect the new replacement components 1120. In this regard, the inventory database 1118 may be updated in real-time to accurately reflect the current inventory at the storage facility.

The component identifier 1116 may be configured to initiate procurement of a replacement component to replace the component causing the condition indicating the fault. The component identifier 1116 may be configured to initiate procurement of the replacement component by automatically generating an order with a supplier of the replacement component. The component identifier 1116 may be configured to initiate procurement of the replacement component based on data in the inventory database 1118. The component identifier 1116 may be configured to cross-reference an identifier (e.g., a part number or other identifier) for the component causing the condition indicating the fault with data in the database. The component identifier 1116 may be configured to determine whether the quantity corresponding to a data entry for the identifier of the component indicates one or more replacement components 1120 at the storage facility. The component identifier 1116 may be configured to initiate procurement of the replacement component responsive to determining that the replacement component is not available in inventory (e.g., as reflected in the data in the inventory database). Additionally or alternatively, the component identifier 1116 may be configured to repurpose existing components within building 10. For example, the component identifier 1116 may identify a rarely used component (e.g., a television that is turned on once every other month, etc.) that may replace a faulty component as a replacement component.

The component identifier 1116 may be configured to automatically generate the order with the supplier based on data in the inventory database 1118. The inventory database 1118 may include data entries including an order form, a supplier, and instructions for preparing the order form. The component identifier 1116 may be configured to automatically generate the order with the supplier using the instructions for preparing the order form when the inventory database 1118 includes data which indicates an absence or shortage of replacement components 1120. The component identifier 1116 may be configured to generate the order by including the identifier (e.g., part number or other identifier) associated with the component causing the condition and a quantity of at least one. In some implementations, such as for particular components which are replaced more commonly, the component identifier 1116 may be configured to select a bulk quantity of components in the order.

In some embodiments, the component identifier 1116 may be configured to automatically transmit (e.g., via the communications interface 507) the generated order to a client device associated with the supplier. In some embodiments, the component identifier 1116 may be configured to transmit (e.g., via the communications interface 507) the generated order to an internal client device (such as the storage facility client device 1108, facility team client device 1110, and so forth) for approval prior to transmission of the generated order to the supplier. An operator or facility team member may receive the generated order from the component identifier 1116 and approve or deny the generated order. Responsive to receiving the approval from the operator or facility team member via their respective client device, the component identifier 1116 may be configured to automatically transmit the generated order to the client device associated with the supplier. The supplier may process and fulfill the order by shipping the replacement components to the storage facility.

The memory 1106 is shown to include a ticket generator 1122. The ticket generator 1122 may be any device(s) or component(s) configured to generate a ticket for replacing the component causing the condition indicating the fault with a replacement component. The ticket may be similar in some aspects to a work order. The ticket may generally be configured to instruct a facility team member on which component(s) in the building are to be replaced. The ticket may indicate a location of the component to be replaced (e.g., within the building), the location of the replacement component (e.g., within the storage facility), and the part number or other identifier associated with the components.

The ticket generator 1122 may be configured to transmit the generated ticket to at least one of the facility team client device(s) 1110. In some embodiments, the ticket generator 1122 is configured to determine a service action for a faulty component. For example, the ticket generator 1122 may determine that the faulty component can be replaced with a rarely used component from within building 10 and may generate a ticket to do so. Additionally or alternatively, the ticket generator 1122 may determine that the faulty component must be replaced with a new item and may generate a ticket to replace the faulty component with a replacement component in storage and/or generate a ticket to order a replacement component from a component provider. In some embodiments, ticket generator 1122 determines that a component does not need to be replaced and/or does not need to be replaced immediately. For example, the ticket generator 1122 may determine that a component with a low priority (e.g., has a low priority fault, is described as non-essential by entity graph 170, etc.) does not need to be replaced (e.g., the component can stop operating without noticeable adverse effects to building 10 and/or users of building 10, etc.). Additionally or alternatively, the ticket generator 1122 may determine that a cost of a faulty component is too high to warrant replacement given the component's low priority. For example, the ticket generator 1122 may determine that a first low priority faulty component does not need to be replaced immediately, but can be replaced when a second high priority faulty component necessitates ordering a number of replacement components at cheaper bulk pricing. For example, the ticket generator 1122 may retrieve price information for a component (e.g., by traversing a digital twin of the component, etc.) and perform a replacement optimization using the price of the component and the priority of the component.

In some embodiments, the ticket generator 1122 generates the ticket upon detection of the condition indicating the fault (hence, at the outset of the condition). In such embodiments, the ticket may be generated regardless of whether or not a replacement component is present at the storage facility. The ticket may indicate whether or not a replacement component is present at the storage facility. Hence, the facility team member which receives the ticket may wait until the replacement component is received to satisfy the ticket where the ticket indicates a replacement component is not present at the storage facility. In some embodiments, the ticket generator may generate the ticket upon detection of the condition, but hold the ticket until receipt of the replacement component at the storage facility, as described in greater detail below. Upon receipt of the replacement component, the ticket generator 1122 transmits the ticket to the facility team client device(s) 1110.

In some embodiments, the ticket generator 1122 may wait to generate the ticket until a replacement component is present at the storage facility. The ticket generator 1122 may thus remain idle until the component identifier generates the order and the order is satisfied by the supplier. Upon receipt of the replacement component at the storage facility, an operator may update the inventory database 1118 via the storage facility client device(s) 1108 to indicate receipt of the replacement component. The ticket generator 1122 may identify receipt of the replacement component at the storage facility. The ticket generator 1122 may generate the ticket responsive to receipt of the replacement component at the storage facility. The ticket generator 1122 may be configured to transmit the generated ticket (e.g., via the communications interface 507) to the facility team client device(s) 1110.

A facility team member may receive the ticket and replace the component causing the condition with a replacement component.

The memory 1106 is shown to include a grade assignor 1124. The grade assignor 1124 may be or include any device(s) or component(s) designed or implemented to assign a grade to a facility team or individual team members. The grade may be used in, for instance, promotion considerations by management, raises or bonuses, efficiency measurement, and so forth. The grade assignor 1124 may be based on the duration between receipt of the ticket and satisfying the ticket. The grade assignor 1124 may be configured to measure the duration by recording the time and date in which the ticket generator 1122 generated (or transmitted) the ticket and identifying the tame and date in which the ticket was satisfied by the facility team (or team member).

In some embodiments, the grade assignor 1124 may be configured to receive an indication from the fault identifier 1114 indicating the fault has been addressed. The fault identifier 1114 may be configured to detect a second condition which indicates the fault is no longer present. The fault identifier 1114 may generate an indication which indicates satisfaction of the fault (e.g., by replacement of the component which caused the condition with the replacement component). The fault identifier 1114 may transmit the indication to the grade assignor 1124. The grade assignor 1124 may be configured to determine the time in which the grade assignor 1124 receives the indication from the fault identifier 1114.

In some embodiments, the grade assignor 1124 may be configured to receive an indication from the facility team client device 1110 which received the ticket. The indication from the facility team client device 1110 may indicate the facility team (or team member) replaced the component causing the condition indicating the fault with the replacement component. The facility team (or team member) may select an option for generating the indication on the facility team client device 1110 responsive to replacing the component with the replacement component. The facility team client device 1110 may transmit the indication via the communications interface 507 to the fault detection processing circuit 1102 for receipt by the grade assignor 1124. The grade assignor 1124 may receive the indication and identify the time and date in which the indication was received.

Figure 5:
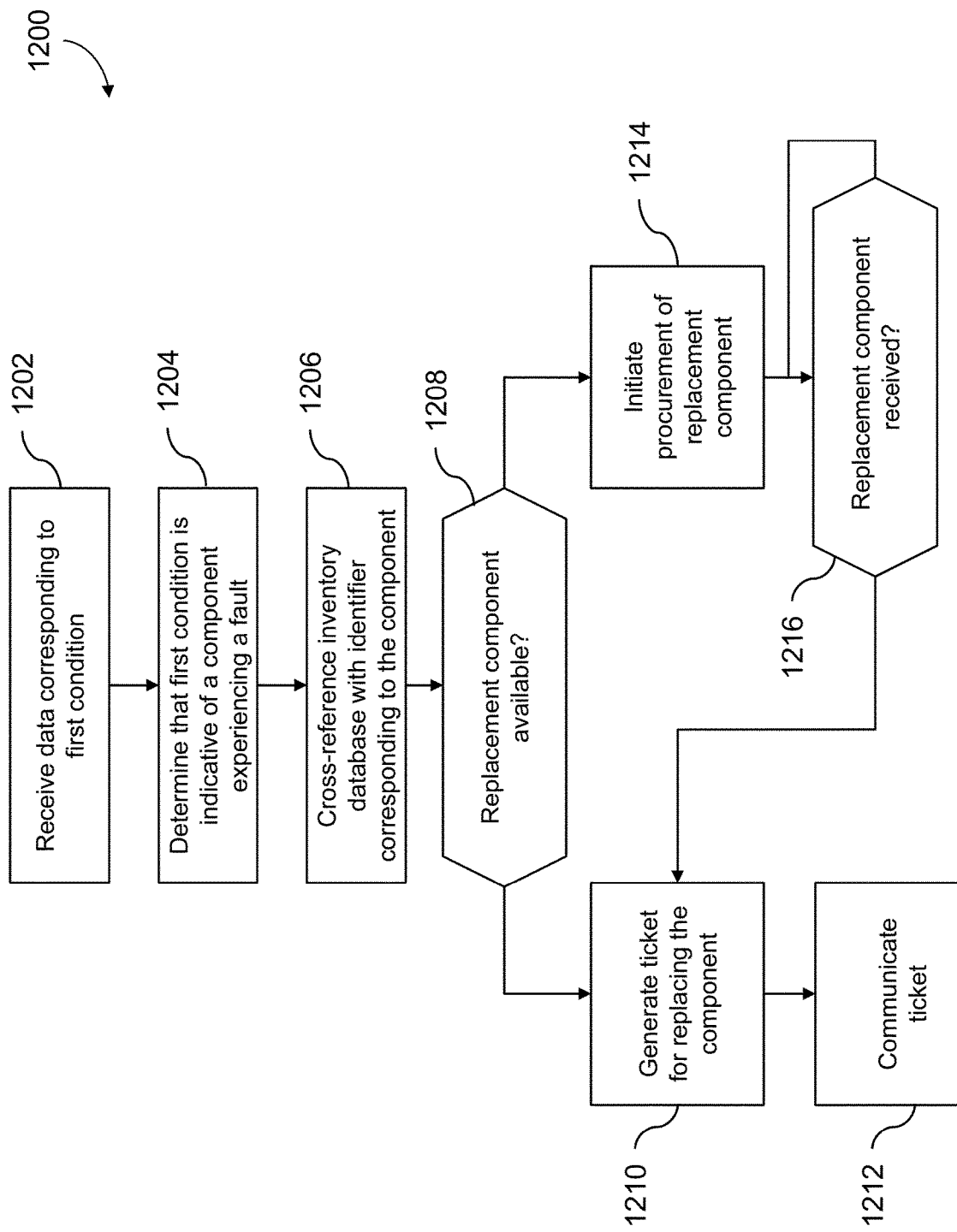
FIG. 5 is a flowchart showing a method of fault detection and management, according to an exemplary embodiment.

Now that various aspects of the system 1100 have been described, an example method of fault detection and management is described. Specifically, FIG. 5 depicts a flowchart showing a method 1200 of fault detection and management, according to an exemplary embodiment. The steps and operations of the method 1200 described with reference to FIG. 5 may be performed by and via the devices, components, and elements described above. However, the method 1200 is not specifically limited to these devices, components, and elements.

At step 1202, the fault detection processing circuit 1102 receives data corresponding to a first condition. In some embodiments, the fault detection processing circuit 1102 receives data corresponding to a first condition of a building subsystems 120 within a building. The fault detection processing circuit 1102 may receive the data via the BMS interface 509 from the building subsystems 120. The fault detection processing circuit 1102 may receive the data from components 1112 within the respective building subsystems 120. The fault detection processing circuit 1102 may receive the data from sensor(s) arranged in the building subsystems 120 and arranged to monitor a condition of the building subsystems 120. The fault detection processing circuit 1102 may receive the data in real-time, at various intervals (e.g., every 10 minutes, every hour, every day, etc.). Additionally or alternatively, the fault detection processing circuit 1102 may receive context information by traversing entity graph 170. For example, the fault detection processing circuit 1102 may traverse a digital twin of a component to retrieve context information associated with the component.

At step 1204, the fault detection processing circuit 1102 determines that the first condition (e.g., at step 1202) is indicative of a component 1112 experiencing a fault. In some embodiments, the fault detection processing circuit 1102 determines, based on the data received at step 1202, that the first condition is indicative of a component 1112 of the building subsystems 120 experiencing a fault. In some embodiments, the first condition may be indicative of the component 1112 of the building subsystem experiencing a fault at a subsequent point in time. Hence, the condition may indicate susceptibility, vulnerability, etc. to a fault at a future point in time. In such embodiments, it may be desirable to proactively replace the component to prevent an untimely fault. In some embodiments, the first condition may be indicative of the component 1112 of the building subsystems 120 currently experiencing the fault (e.g., in real-time).

The fault detection processing circuit 1102 may determine that the first condition is indicative the component 1112 experiencing a fault by comparing the data received at step 1202 with "normal" or trend data which indicates proper operation of the component 1112. The fault detection processing circuit 1102 may store various data which corresponds to expected operation data of various components 1112 in the building subsystems 120. The fault detection processing circuit 1102 may compare the data received at step 1202 to the expected operation data. The fault detection processing circuit 1102 may determine, based on the comparison, that the component is operating outside of an expected range of operation or the component 1112 is likely to operate outside of the expected range of operation at a future point in time. The fault detection processing circuit 1102 may identify a component identifier (such as a part number or other reference or identifier) for the component 1112 experiencing a fault.

At step 1206, the fault detection processing circuit 1102 cross-references an inventory database 1118 with the identifier corresponding to the component 1112. The fault detection processing circuit 1102 may store or otherwise access the inventory database 1118. The inventory database 1118 may include data corresponding to an inventory of available replacement components for a number of building subsystems 120. The inventory may be stored at a storage facility. The inventory database may include data entries which indicate identifiers corresponding to various replacement components 1120 and a quantity of replacement components 1120. Team members or operators at the storage facility may maintain the inventory database 1118 by updating the data entries as replacement components are used or new shipments of replacement components are received at the storage facility. Hence, the inventory database 1118 may be updated to reflect a current status of inventory at the storage facility. The fault detection processing circuit 1102 may use the identifier for the component determined at step 1204 for cross-referencing with the inventory database 1118.

At step 1208, the fault detection processing circuit 1102 determines whether a replacement component corresponding to the component experiencing the fault is available. The fault detection processing circuit 1102 may determine whether the replacement component is available based on the cross-referencing performed at step 1206. Where the quantity in a data entry corresponding to the component experiencing a fault indicates one or more replacement components are available, the method 1200 may proceed to steps 1210 and 1212, where the fault detection processing circuit 1102 generates and communicates a ticket for replacing the component. Where the quantity in the data entry corresponding to the component experiencing a fault indicates that no components are available, the method 1200 may proceed to step 1214.

At step 1214, the fault detection processing circuit 1102 initiates procurement of a replacement component. In some embodiments, the fault detection processing circuit 1102 initiates procurement of a replacement component by automatically generating an order with a supplier of the replacement component. In some embodiments, the inventory database 1118 may store (e.g., in the data entry corresponding to the components, associated with the data entry, etc.) an order form and instructions for completing the order form. The fault detection processing circuit 1102 may automatically generate the order by populating the order form using the instructions from the inventory database 1118. The fault detection processing circuit 1102 may provide or otherwise input the part number or other component identifier to the order form and a quantity (which may be one or may be a bulk order). The fault detection processing circuit 1102 may transmit the generated order to the supplier (or to a facility team member via their client device 1110 for approval prior to transmitting the generated order to the supplier). The supplier may receive the order via a respective supplier client device, process the order, and ship the replacement component to the storage facility.

At step 1216, the fault detection processing circuit 1102 may determine whether the replacement component was received. The fault detection processing circuit 1102 may monitor the inventory database 1118 to determine whether the replacement component was received at the storage facility. The fault detection processing circuit 1102 may generate (e.g., upon transmission of the generated order to the supplier at step 1214) a recurring flag to monitor the inventory database 1118. The fault detection processing circuit 1102 may monitor the inventory database 1118 at various intervals (such as twice a day, for instance). The fault detection processing circuit 1102 may loop at step 1216 until the replacement component is received (e.g., as reflected in the inventory database 1118). When the replacement component is received, the method 1200 may proceed back to step 1210.

At step 1210, the fault detection processing circuit 1102 generates a ticket for replacing the component. In the embodiment depicted in FIG. 5, the fault detection processing circuit 1102 generates the ticket responsive to receipt of the replacement component. In some implementations, the fault detection processing circuit 1102 may generate the ticket upon determining (e.g., at step 1204) that the first condition is indicative of the component experiencing a fault. Hence, the present disclosure is not limited to the particular arrangement shown in FIG. 5. The ticket generated by the fault detection processing circuit 1102 may include data or other information which indicates the location of the component to be replaced (e.g., building, zone, floor, room, etc.), the location of the replacement component (e.g., within the storage facility), and an identifier of the replacement component.

At step 1212, the fault detection processing circuit 1102 communicates the ticket to a facility team client device 1110. The fault detection processing circuit 1102 may transmit the ticket via the communications interface 507 to a facility team client device 1110. In some embodiments, the fault detection processing circuit 1102 communicates the ticket upon receipt of the replacement component (e.g., at step 1216) or upon determination that the replacement component is available (e.g., at step 1208). In some embodiments, the fault detection processing circuit 1102 communicates the ticket upon generation of the ticket (e.g., following step 1210) without consideration of whether or not the replacement component is available (e.g., at step 1208) or the replacement component is received (e.g., at step 1216).

In some embodiments, following communication of the ticket to the facility team client device 1110 at step 1212, the fault detection processing circuit 1102 may monitor the duration between communication of the ticket and a time in which the condition detected at step 1204 is resolved. The fault detection processing circuit 1102 may use the duration for assigning a grade to the facility team or facility team members. The fault detection processing circuit 1102 may identify the time in which the condition detected at step 1204 is resolved by receiving subsequent data and detecting, based on the subsequent data, that the subsequent condition of the building subsystem indicates the fault has been resolved.

Figure 6:
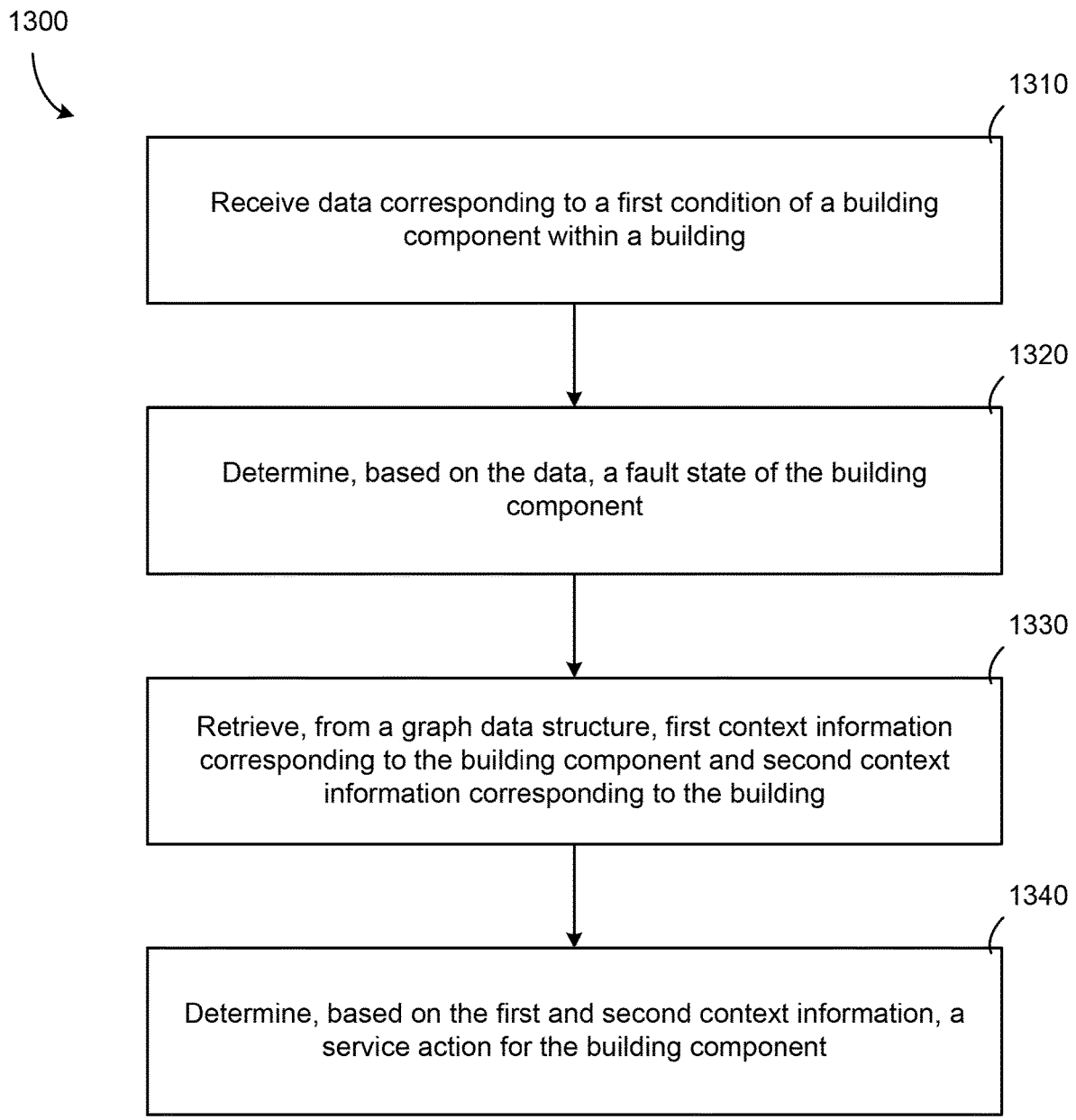
FIG. 6 is a flowchart showing a method of determining a service action, according to an exemplary embodiment.

Referring now to FIG. 6, a method 1300 of determining a service action is shown, according to an exemplary embodiment. In various embodiments, fault detection processing circuit 1102 performs method 1300. At step 1310, fault detection processing circuit 1102 receives data corresponding to a first condition of a building component within a building. The first building component may include a building subsystem (e.g., a HVAC subsystem, a security subsystem, etc.), a component (e.g. a projector, a VAV unit, a thermostat, a computer, a light, a door lock, an AV system, etc.), a space, (e.g., conference room, a lobby, a parking lot, an auditorium, etc.), and any other system associated with building 10. In various embodiments, the data corresponding to the first condition may include fault information. For example, the data may include a fault status as indicated by a FDD system. Additionally or alternatively, the data may include sensor data.

At step 1320, fault detection processing circuit 1102 determines, based on the data, a fault state of the building component. For example, fault detection processing circuit 1102 may implement a FDD system (e.g., a prediction based FDD system, a Bayesian FDD system, a deep-neural-network FDD system, etc.) to generate a fault determination based on received sensor data. In various embodiments, the fault state may be binary (e.g., fault/no-fault, etc.). In some embodiments, the fault state may be continuous (e.g., a fault severity, a fault priority, etc.). In various embodiments, fault detection processing circuit 1102 determines an actual and/or anticipated fault state of the building component. For example, fault detection processing circuit 1102 may determine a first anticipated fault state for a first building component indicating that the first building component is likely to enter a fault state in the near future. As a further example, fault detection processing circuit 1102 may determine a second actual fault state for a second building component indicating that the second building component is currently in a fault state (e.g., non-operational, etc.).

At step 1330, fault detection processing circuit 1102 retrieves from a graph data structure, first context information corresponding to the building component and/or second context information corresponding to the building (e.g., building 10, etc.). In various embodiments, the graph data structure includes a number of entities and a number of relationships between the entities. In various embodiments, the graph data structure represents a space, person, component, and/or event as described above. Entity graph 170 may include the graph data structure and may represent a digital twin of a space, person, component, and/or event. The first context information may include component usage history, component service history, component price, a list of available component replacements, a component make/model, a component identifier, physical characteristics of the component (e.g., images, CAD models, etc.), component priority (e.g., highly critical component, a low priority accessory component, etc.), and or any other descriptive information corresponding to the component. Similarly, the second context information may include building components, inventory information, component usage information, space usage information, component price information, resource consumption information, and the like. In various embodiments, fault detection processing circuit 1102 retrieves the context information by traversing a digital twin of the component and/or building.

At step 1340, fault detection processing circuit 1102 determines, based on the first and/or second context information, a service action for the building component. For example, fault detection processing circuit 1102 may generate a ticket to replace the building component with an unused replacement building component within building 10. The service action may include ordering a replacement component from a component provider, replacing the component with a replacement component in storage, replacing the component with a repurposed component from building 10, a service request, leaving the component as is (e.g., not replacing the component, etc.), and the like. While specific service actions are described herein, the possible service actions are not limited to those enumerated herein. For example, the building component may include a faulty projector and fault detection processing circuit 1100 may determine that a projector in building 10 is unused (e.g., based on the second context information, etc.) and can replace the faulty projector. As another example, fault detection processing circuit 1100 may determine based on the first context information that the building component is very expensive to replace and is hardly used (e.g., a conference room chair in a conference room that is only booked once a year, etc.) and may determine not to take any service action (e.g., do not replace the building component, update a digital twin of the building component to reflect the determination, etc.). In various embodiments, the context information include price information. For example, the context information may include a price of a building component replacement and fault detection processing circuit 1102 may determine not to replace the component based on the price of the building component replacement. Additionally or alternatively, the context information may include building component usage information. For example, the context information may indicate that the building component is used very frequently (e.g., a HVAC system for heating a main building, etc.) and may prioritize a service request associated with the building component.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry. The term processing circuit as used herein may include hardware, software, or any combination thereof. For example, a processing circuit may include a processor and memory having instructions stored thereon that, when executed by the processor, cause the processing circuit to perform the operations described herein.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer-readable storage media having instructions stored thereon that, when executed by one or more processors, cause the one or more processors to:
   receive data corresponding to a first condition of a piece of building equipment within a building;
   determine, based on the data, an actual or anticipated fault state of the piece of building equipment;
   store a graph data structure including a plurality of digital twins representing a plurality of entities and a plurality of relationships between the plurality of digital twins, and wherein the graph data structure represents at least one of a space, person, component, or event, wherein at least one digital twin of the plurality of digital twins includes historical maintenance data associated with the piece of building equipment, a utilization of the piece of building equipment, and a utilization of a space of the building;
   retrieve first context information corresponding to the utilization of the piece of building equipment and second context information corresponding to the utilization of the space of the building from the plurality of digital twins;
   assign a fault priority level to the piece of building equipment based on the first context information corresponding to the utilization of the piece of building equipment and the second context information corresponding to the utilization of the space of building; and
   implement a service action for the piece of building equipment based on the fault priority level, by determining an availability of a replacement building device by traversing at least a portion of the plurality of digital twins and the plurality of relationships within the graph data structure to identify one digital twin of the plurality of digital twins storing inventory data within the graph data structure and generating data to procure the replacement building device.

2. The one or more non-transitory computer-readable storage media of claim 1, wherein the instructions cause the one or more processors to implement the service action for the piece of building equipment by:

determining the availability of the replacement building device by traversing at least the portion of the plurality of digital twins and the plurality of relationships within the graph data structure to identify the one digital twin of the plurality of digital twins storing the inventory data within the graph data structure with an identifier; and in response to determining that the replacement building device is not available, procuring the replacement building device by generating an order with a supplier of the replacement building device.

3. The one or more non-transitory computer-readable storage media of claim 2, wherein determining the availability of the replacement building device further includes identifying, based on the second context information, a similar component within the building as the replacement building device, wherein the similar component is unused.

4. The one or more non-transitory computer-readable storage media of claim 2, wherein the first context information includes information describing an impact of the piece of building equipment, and wherein implementing the service action for the piece of building equipment is based on the impact.

5. The one or more non-transitory computer-readable storage media of claim 2, wherein implementing the service action includes:
generating a ticket for replacing the piece of building equipment; and
transmitting the ticket to a client device associated with a member of a facility team.

6. The one or more non-transitory computer-readable storage media of claim 5, wherein the ticket is generated in response to receiving the replacement building device from the supplier.

7. The one or more non-transitory computer-readable storage media of claim 2, wherein the graph data structure includes an inventory database.

8. The one or more non-transitory computer-readable storage media of claim 1, wherein the first context information includes impact information related to the actual or anticipated fault state of the piece of building equipment, and wherein implementing the service action includes determining whether to replace the piece of building equipment based on the impact information.

9. A method, comprising:
receiving data corresponding to a first condition of a piece of building equipment within a building;
determining, based on the data, an actual or anticipated fault state of the piece of building equipment;
storing a graph data structure including a plurality of digital twins representing a plurality of entities and a plurality of relationships between the plurality of digital twins, and wherein the graph data structure represents at least one of a space, person, component, or event, wherein at least one digital twin of the plurality of digital twins includes historical maintenance data associated with the piece of building equipment, a utilization of the piece of building equipment, and a utilization of a space of the building;
retrieving first context information corresponding to the utilization of the piece of building equipment and second context information corresponding to the utilization of the space of the building from the plurality of digital twins;
assigning a fault priority level to the piece of building equipment based on the first context information corresponding to the utilization of the piece of building equipment and the second context information corresponding to the utilization of the space of building; and
implementing a service action for the piece of building equipment based on the fault priority level, by determining an availability of a replacement building device by traversing at least a portion of the plurality of digital twins and the plurality of relationships within the graph data structure to identify one digital twin of the plurality of digital twins storing inventory data within the graph data structure and generating data to procure the replacement building device.

10. The method of claim 9, wherein implementing the service action for the piece of building equipment includes:
determining the availability of the replacement building device by traversing at least the portion of the plurality of digital twins and the plurality of relationships within the graph data structure to identify the one digital twin of the plurality of digital twins storing the inventory data within the graph data structure with an identifier; and
in response to determining that the replacement building device is not available, procuring the replacement building device by generating an order with a supplier of the replacement building device.

11. The method of claim 10, wherein determining the availability of the replacement building device further includes identifying, based on the second context information, a similar component within the building as the replacement building device, wherein the similar component is unused.

12. The method of claim 10, wherein the first context information includes information describing an impact of the piece of building equipment, and wherein implementing the service action for the piece of building equipment based on the fault priority level, is based on the impact.

13. The method of claim 10, wherein implementing the service action includes:
generating a ticket for replacing the piece of building equipment; and
transmitting the ticket to a client device associated with a member of a facility team.

14. The method of claim 13, wherein the ticket is generated in response to receiving the replacement building device from the supplier.

15. The method of claim 10, wherein the graph data structure includes an inventory database.

16. The method of claim 9, wherein the first context information includes impact information related to the actual or anticipated fault state of the piece of building equipment, and wherein implementing the service action includes determining whether to replace the piece of building equipment based on the impact information.

17. A building management system (BMS), comprising:
one or more processing circuits and one or more computer readable storage media, the one or more computer readable storage media having instructions stored thereon that, when executed by the one or more processing circuits, cause the one or more processing circuits to:
receive data corresponding to a first condition of a piece of building equipment within a building;
determine, based on the data, an actual or anticipated fault state of the piece of building equipment;
store a graph data structure including a plurality of digital twins representing a plurality of entities and a plurality of relationships between the plurality of digital twins, and wherein the graph data structure represents at least one of a space, person, component, or event, wherein at least one digital twin of the plurality of digital twins includes historical maintenance data associated with the piece of building equipment, a utilization of the piece of building equipment, and a utilization of a space of the building;

retrieve first context information corresponding to the utilization of the piece of building equipment and second context information corresponding to the utilization of the space of the building from the plurality of digital twins;

assign a fault priority level to the piece of building equipment based on the first context information corresponding to the utilization of the piece of building equipment and the second context information corresponding to the utilization of the space of building; and implement a service action for the piece of building equipment based on the fault priority level, by determining an availability of a replacement building device by traversing at least a portion of the plurality of digital twins and the plurality of relationships within the graph data structure to identify one digital twin of the plurality of digital twins storing inventory data within the graph data structure and generating data to procure the replacement building device.

18. The building management system (BMS) of claim 17, wherein implementing the service action for the piece of building equipment includes:

determining the availability of the replacement building device by traversing at least the portion of the plurality of digital twins and the plurality of relationships within the graph data structure to identify the one digital twin of the plurality of digital twins storing the inventory data within the graph data structure with an identifier; and in response to determining that the replacement building device is not available, procuring the replacement building device by generating an order with a supplier of the replacement building device.

19. The building management system (BMS) of claim 17, wherein determining the availability of the replacement building device further includes identifying, based on the second context information, a similar component within the building as the replacement building device, wherein the similar component is unused.

20. The building management system (BMS) of claim 17, wherein the first context information includes information describing an impact of the piece of building equipment, and wherein implementing the service action for the piece of building equipment is based on the impact.

\* \* \* \* \*